March 18, 1969     R. F. BRUNNER ET AL     3,433,450

EJECTOR AND MOLD PLATE ATTACHMENT FOR PLASTIC MOLDING MACHINES

Filed Dec. 12, 1966

INVENTORS
Robert F. Brunner
Wayne O. Garrett

BY *Walter S. Murray*

ATTY.

United States Patent Office 3,433,450
Patented Mar. 18, 1969

3,433,450
EJECTOR AND MOLD PLATE ATTACHMENT FOR PLASTIC MOLDING MACHINES
Robert F. Brunner, 1624 1st Ave. and Wayne O. Garrett, 4346 Cappel Drive, both of Cincinnati, Ohio 45205
Filed Dec. 12, 1966, Ser. No. 601,109
U.S. Cl. 249—67      4 Claims
Int. Cl. B29f 1/14

The present invention relates to plastic molding machines and is particularly directed to a novel ejector construction for mold assemblies that are detachably incorporated in these machines.

In general, the plastic molding art utilizes standard machines which are adapted to detachably mount and actuate cooperative mold plates that are adapted to form plastic articles; the plates being demountable in order that these machines may accommodate mold plates for making a variety of plastic articles depending upon the configurations preformed in the cooperating plates. There is one problem that is encountered in the makeup of these cooperating die or mold plates. This problem is greatly increased when the articles are small and/or numerous; which is that one mold plate must not only be formed with appropriate mold cavities and connecting sprues but also provided with tapped mold plate mounting bores and with through holes to receive mold ejector or stripping pins. When there are many small cavities required to be formed in the mold plates the die maker is hard pressed to find sufficient body material left in the plates to form mounting bores, ejector pin holes and water lines, and in many cases the plates are so weakened that they often fail to withstand the subsequent molding pressures exerted thereon by the machine.

It is therefore the particular object of this invention to provide an improved and simplified ejector and mold plate mounting attachment that will overcome the disadvantages set forth hereinbefore.

Another object of the invention is to provide an ejector and mold plate mounting attachment that is especially advantageous when the plate body material is of a limited nature after the necessary mold cavities and sprues are formed therein.

Other objects and advantages will be apparent and best understood by reference to the following specification taken in conjunction with the accompanying drawings, wherein.

Figure 1:
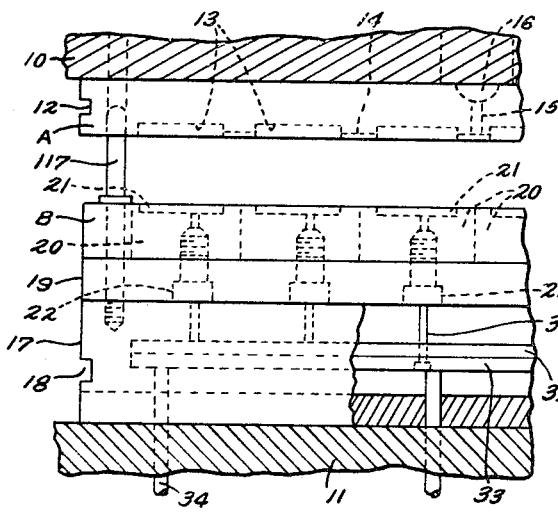
FIG. 1 is a fragmental, front elevational view of the ejector and mold plate mounting attachments with the plates shown in open position; the operating platens of the conventional molding machine being broken away and shown in section.

In the drawings the reference numeral 10 indicates the stationary platen of a standard molding machine and 11 indicates a cooperating platen of the machine that is movable toward and away from the platen 10. A cavity die plate A is detachably fastened to the platen 10 by the usual mounting shoe (not shown) which engages grooves 12 in opposite sides of said plate. The major face of the plate A is provided with a number of plastic molding die cavities 13 which may be interconnected by a filling runner 14 that in turn communicates with a sprue channel 15 having a seat 16 for receiving the usual plastic molding material injector nozzle (not shown), or the like.

Figure 2:
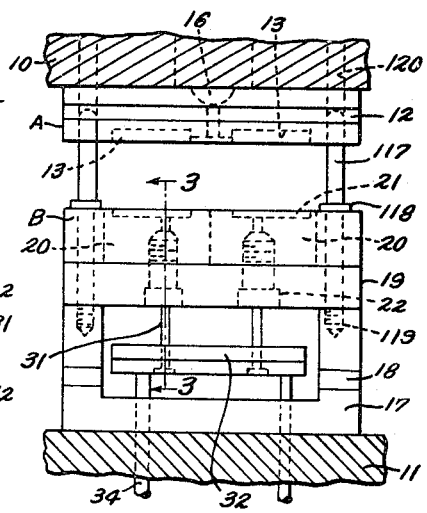
FIG. 2 is a side elevational view of the machine and mold plates as shown in FIG. 1.

The movable platen 11 supports a generally U-shaped block 17 which is positioned thereon by means of the usual mounting shoe (not shown) that engages grooves 18 formed in opposite sides of said block. A plate B and a support plate 19 are part of the platen 11 and are mounted upon the mold block 17 as by means of guide pins 117 having shoulders 118 which engage upon the plate B and are threaded at their lower ends in tapped holes 119 in the block 17. As best shown in FIG. 2 the upper ends of the pins 117 slide in aligned guide holes 120 formed in the plate A and the platen 10. The plate B is open at its central portion to receive a number of insert cavity die blocks 20 therein. The die blocks 20 are each provided with a molding cavity 21 which is formed therein in alignment with one of the molding cavities 13 formed in the die plate A.

Figure 5:
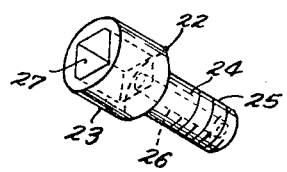
FIG. 5 is a perspective view of one of the ejector receiving, die plate mounting bolts of my invention.

Each insert cavity die block 20 is removably clamped to the back-up plate 19 within the confines of the plate B by means of an ejector receiving, mounting bolt 22 which, as best shown in FIG. 5, has a generally cylindrical head 23 and a shank 24 that has its outer free portion externally threaded as at 25. Extending coaxially entirely through the shank 24 and somewhat into the head 23 is a bearing hole 26, said hole communicating with a relatively larger irregular, tool engaging recess 27 formed concentrically in the head 23 of the bolt.

Figure 3:
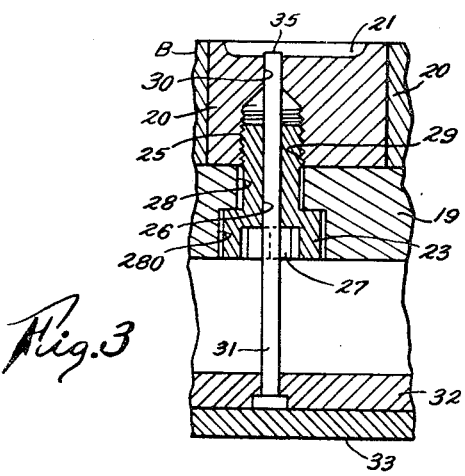
FIG. 3 is an enlarged section taken on line 3—3 of FIG. 2.

As all of the cavity die block clamping attachments are identical only one attachment will be described hereinafter and with particular reference to FIG. 3 it will be noted that a bolt receiving hole 28 preferably counter-bored at 280 is formed in the back-up plate 19 in alignment with the central portion of the mold cavity 21 in the die block 20 to snugly receive the bolt head 23 and the unthreaded part of the shank 24, a tapped bore 29 being formed in the cavity die block 20 in axial alignment with the hole 28 in the back-up plate to threadedly receive the externally threaded portion 25 of the bolt. A through hole 30 is formed in the die block 20 coaxially with the bearing hole 26 in the bolt, said hole 30 creating open communication between the bottom of the mold cavity 21 and the tapped bore 29 formed in the insert block 20.

The platen 11 carries at least one ejector pin 31 for each cavity mold 21 in the die block 20 for the purpose of knocking out or ejecting a completed plastic article disposed in the cavity 21 after the molding operation. Each pin 31 is mounted for axial movement on an actuating plate 32 and a pin support plate 33, said plates being simultaneously movable relative to the U-shaped block 17 through their operating connection with push rods 34.

The upper end portion of each ejector pin 30 freely passes through the tool engaging recess 27 in the bolt head 23 and is slidably received in the bearing hole 26; the end portion of the pin extending through and preferably being slidably and snugly received in the hole 30 formed in the die block 20. Normally, as shown in the drawings, the terminal end 35 of the pin 31 projects slightly above the bottom of the cavity 21 and upon pin actuation is forced into the cavity thereby ejecting the finished plastic article from the cavity.

Figure 4:
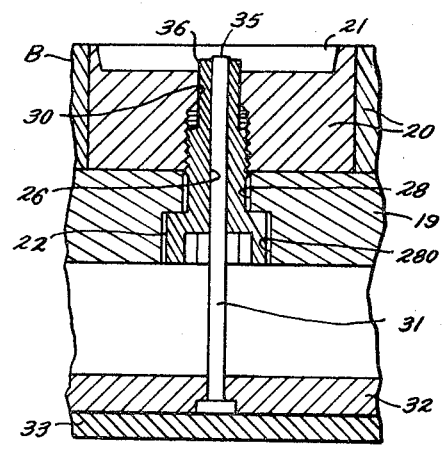
FIG. 4 is a sectional view like FIG. 3 showing a modified form of my ejector and mold plate mounting construction.

With reference to FIG. 4 which shows a slightly modified form of our invention, it will be noted that the shank 24 of the bolt 22 is provided with an integral, cylindrically shaped core extension 36 that is coaxial with and narrower than the bolt shank, and that the bearing hole 26 in the bolt extends completely through the extension 36. The extension 36 passes through the hole 30 in the die block 20 and when the attachment parts are in assembled condition the end portion of the bolt extension 36 projects above the bottom of the cavity 21 and the terminal end 35 of the ejector pin 31 normally projects slightly above the top of the bolt extension.

It will therefore be understood that our invention eliminates the necessity of drilling extra holes into the mold die blocks and the difficulties these extra holes present in the making of a mold block, such as counter boring and threading of extra holes when the space for such machining is limited. This saving of extra machining also eases the difficulty of placing water lines sometimes required to be made in certain plastic molds.

What is claimed is:

1. An attachment for clamping a cavity die block to the platen of a molding machine having a relatively movable ejector pin associated therewith; the combination of a bolt receiving hole formed in the platen in line with a cavity in the die block, a tapped bore formed in the die block coaxially with the bolt receiving hole, a hole formed in the die block coaxially with the tapped bore and creating open communication between the bottom of the cavity and the tapped bore, a clamping bolt having a head and a shank, said head engaging the platen, said shank having external threads on its end portion and receivable in the hole in the platen with the threaded end thereof in threaded clamping engagement with the tapped bore in the die block, said shank and a portion of the head having a coaxially disposed bearing hole formed therethrough and said head having an irregular, tool engaging recess therein in communication with said bearing hole, said ejector pin freely passing through the tool recess and slidable in the bearing hole in the bolt, and the upper end of said pin extending through the hole in the die block.

2. An attachment as set forth in claim 1 characterized by the fact that the hole in the platen has a counter-bore and that the bolt head is receivable in said counter-bore.

3. An attachment as set forth in claim 1 wherein the bolt shank is provided with an integral, cylindrically shaped extension, and said extension extends through the hole in the die block into the cavity.

4. An attachment as set forth in claim 3 wherein the bolt extension is coaxial with and narrower than the bolt shank.

References Cited

UNITED STATES PATENTS

| | | | |
|---|---|---|---|
| 2,398,893 | 4/1946 | Quarnstrom | 249—68 |
| 2,789,311 | 4/1957 | Holt | 249—68 X |
| 3,013,308 | 12/1961 | Armour. | |
| 3,103,705 | 9/1963 | Letica | 249—68 |

J. SPENCER OVERHOLSER, *Primary Examiner.*

J. HOWARD FLINT, JR., *Assistant Examiner.*

U.S. Cl. X.R.

18—2